United States Patent
Takezawa et al.

(10) Patent No.: US 7,754,390 B2
(45) Date of Patent: Jul. 13, 2010

(54) MANUFACTURING METHOD OF NEGATIVE ELECTRODE FOR NONAQUEOUS ELECTROLYTIC RECHARGEABLE BATTERY, AND NONAQUEOUS ELECTROLYTIC RECHARGEABLE BATTERY USING IT

(75) Inventors: Hideharu Takezawa, Nara (JP);
Toshitada Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 450 days.

(21) Appl. No.: 11/708,341

(22) Filed: Feb. 21, 2007

(65) Prior Publication Data

US 2007/0218365 A1 Sep. 20, 2007

(30) Foreign Application Priority Data

Mar. 14, 2006 (JP) ............................. 2006-068781

(51) Int. Cl.
*H01M 4/24* (2006.01)
(52) U.S. Cl. ................ 429/331; 429/223; 429/152; 429/246
(58) Field of Classification Search .............. 429/331; 427/122, 123, 404, 249; 264/81, 105, 136
See application file for complete search history.

(56) References Cited

U.S. PATENT DOCUMENTS

| 4,931,240 A | * | 6/1990 | Tajima et al. | ................. 264/81 |
| 2003/0124265 A1 | * | 7/2003 | Bellmann et al. | ............ 427/536 |
| 2007/0111099 A1 | * | 5/2007 | Nanjundaswamy et al. | ............ 429/231.95 |

FOREIGN PATENT DOCUMENTS

| JP | 2005-038720 | | 2/2005 |
| JP | 2005-038720 | * | 10/2005 |
| WO | 96/27910 | | 9/1996 |

* cited by examiner

*Primary Examiner*—Melvin C Mayes
*Assistant Examiner*—Colette Nguyen
(74) *Attorney, Agent, or Firm*—Wenderoth, Lind & Ponack, L.L.P.

(57) ABSTRACT

A negative electrode for a nonaqueous electrolytic rechargeable battery capable of storing and discharging lithium ions is manufactured in the steps of forming a lithium metal layer on a carrier substrate by a gas phase method, superimposing the surface of the lithium metal layer formed on the carrier substrate on a negative electrode active material layer formed on a collecting body, storing the lithium metal layer into the negative electrode active material layer in nonaqueous electrolyte, and removing the carrier substrate from the negative electrode active material layer.

9 Claims, 6 Drawing Sheets

MANUFACTURING METHOD OF NEGATIVE ELECTRODE FOR NONAQUEOUS ELECTROLYTIC RECHARGEABLE BATTERY, AND NONAQUEOUS ELECTROLYTIC RECHARGEABLE BATTERY USING IT

BACKGROUND OF THE INVENTION

1. Field of the Invention

The present invention relates to a method of manufacturing a negative electrode for a nonaqueous electrolytic rechargeable battery that reduces irreversible capacity of the negative electrode and prevents the capacity of the nonaqueous electrolytic rechargeable battery from reducing, and the nonaqueous electrolytic rechargeable battery using it.

2. Background Art

As the number of portable and cordless electronic apparatuses has been recently increased, expectations on small and light nonaqueous electrolytic rechargeable batteries having high energy density have been raised. Presently, carbon material such as graphite has been in practical use as negative electrode active material of the nonaqueous electrolytic rechargeable batteries. However, the theoretical capacity density of the carbon material is 372 mAh/g (833 mAh/cm$^3$). For increasing the energy density of the nonaqueous electrolytic rechargeable batteries, silicon (Si), tin (Sn) or germanium (Ge) that is combined with lithium to form an alloy, oxide thereof, and alloy thereof are studied. The theoretical capacity densities of these negative electrode active materials exceed 833 mAh/cm$^3$, and are larger than that of the carbon material. Of these negative electrode active materials, silicon-containing particles such as Si particles and silicon oxide particles are inexpensive and hence are studied widely.

When carbon material or negative electrode active material of which theoretical capacity density exceeds 833 mAh/cm$^3$ is used in a nonaqueous electrolytic rechargeable battery, however, the irreversible capacity is generally large and hence a nonaqueous electrolytic rechargeable battery having a large battery capacity cannot be obtained.

The irreversible capacity means a capacity eliminated by initial charge and discharge. In a charge/discharge reaction of a conventional nonaqueous electrolytic rechargeable battery, lithium discharged from the positive electrode is stored in the negative electrode during charge, and lithium discharged from the negative electrode is stored in the positive electrode during discharge. When the irreversible capacity in the negative electrode is large at the time of initial charge and discharge, part of the reversible capacity originally possessed by the negative electrode and positive electrode runs down, and hence a nonaqueous electrolytic rechargeable battery of large battery capacity is not obtained. The irreversible capacity of the negative electrode is caused by partial inactivation of lithium that is caused by side reaction with electrolyte occurring during charge or by retention of reversible lithium that is caused by hysteresis of storage/discharge voltage of lithium. The irreversible capacity is thought to cause the reduction of available reversible capacity.

For reducing the decrease in battery capacity caused by the irreversible capacity of the negative electrode, technology of previously charging lithium into the negative electrode is proposed.

For example, Japanese Patent Unexamined Publication No. 2005-38720 (hereinafter referred to as "patent document 1") discloses the following method of manufacturing a negative electrode. A light metal layer made of metal lithium or the like is formed on a negative electrode active material layer containing a polymeric binder by a dry film forming method such as a direct vacuum deposition method, and is then stored in a dry atmosphere or electrolyte. Thus, lithium is previously stored in the negative electrode.

International Publication No. 96/27910 (hereinafter referred to as "patent document 2") discloses another manufacturing method. In this method, metal lithium foil or the like is stuck by roll transfer or the like to a negative electrode sheet having a composite oxide containing tin or the like, a battery is then formed, and electrolyte is injected into the battery, thereby previously storing lithium in the negative electrode.

In the negative electrode in patent document 1, since vaporized metal lithium of 500° C. or higher is directly formed on the negative electrode active material layer by the vacuum deposition method, the polymeric binder and the negative electrode active material in the negative electrode active material layer are deteriorated by solidification heat of metal lithium during film forming. As a result, the function as a binder decreases in the polymeric binder. In the negative electrode active material, crystallization or the like of amorphous material in the negative electrode active material reduces the reversibility of lithium ions, and hence can reduce the charge/discharge cycle characteristic.

In the negative electrode in patent document 2, since the metal lithium foil is stuck to the whole surface of the negative electrode sheet, the thickness of the metal lithium foil must be 30 μm or smaller in consideration of the amount of lithium stored in the negative electrode.

When the metal lithium foil is thin, however, it is extremely difficult to manufacture, manage, and handle it from the view point of mechanical strength, surface adherence, and safety. Therefore, high productivity cannot be obtained.

For preparing metal lithium foil having a handleable thickness, a method of partly sticking metal lithium foil onto the negative electrode active material layer in a strip shape is considered, for example. Even in this case, since the metal lithium foil is stuck onto the negative electrode active material layer in the strip shape, the storage amount of metal lithium in the negative electrode active material layer depends on the existence of the metal lithium foil. As a result, the negative electrode partly deforms due to expansion, or non-uniform reaction occurs during charge and discharge.

In the conventional metal lithium foil produced by extrusion molding or rolling, the surface is not flat and variation in thickness cannot be controlled to be 5 μm or smaller. Therefore, it is difficult to uniformly stick the metal lithium foil to the negative electrode active material layer. As a result, disadvantageously, variation in battery capacity is large, and controlling the variation reduces the productivity significantly.

SUMMARY OF THE INVENTION

A method of manufacturing a negative electrode for a nonaqueous electrolytic rechargeable battery, according to the present invention, has the following steps:

forming a lithium metal layer on a carrier substrate by a gas phase method;

superimposing the whole surface of the lithium metal layer formed on the carrier substrate on a negative electrode active material layer formed on a collecting body;

storing the lithium metal layer into the negative electrode active material layer in nonaqueous electrolyte; and removing the carrier substrate from the negative electrode active material layer.

The nonaqueous electrolytic rechargeable battery of the present invention has a negative electrode for the nonaqueous electrolytic rechargeable battery produced by the above-mentioned manufacturing method, a positive electrode for reversibly storing and discharging lithium ions, and nonaqueous electrolyte.

DETAILED DESCRIPTION OF THE INVENTION

An exemplary embodiment of the present invention will be described with reference to the drawings. The present invention is not limited to the following contents as long as it complies with the basic feature described in this description.

Embodiment

Figure 1:
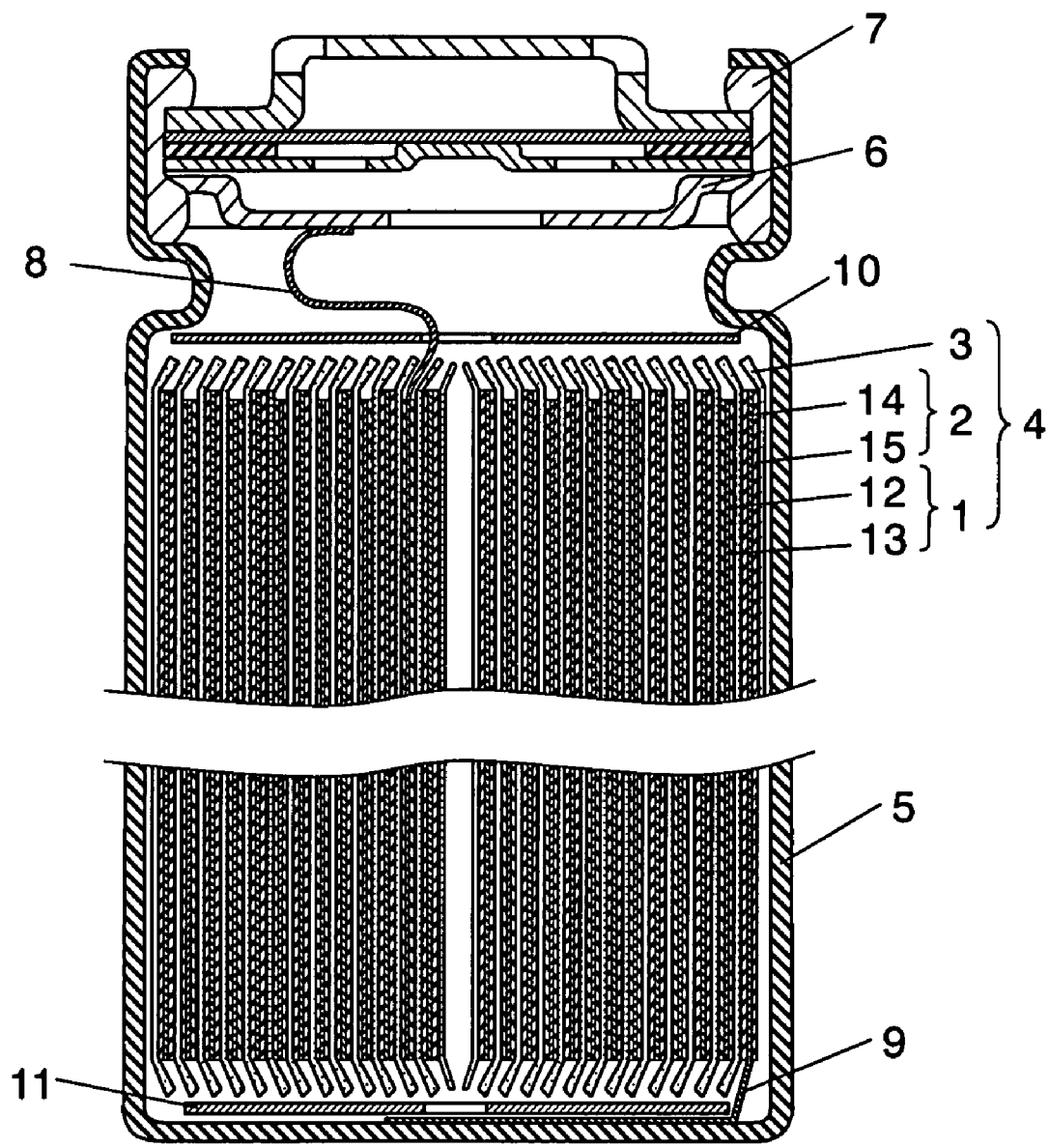
FIG. 1 is a sectional view of a nonaqueous electrolytic rechargeable battery in accordance with an exemplary embodiment of the present invention.

FIG. 1 is a sectional view of a nonaqueous electrolytic rechargeable battery in accordance with an exemplary embodiment of the present invention.

In FIG. 1, a cylindrical nonaqueous electrolytic rechargeable battery (hereinafter referred to as "battery") has electrode group 4 where positive electrode 1 and negative electrode 2 are wound via separator 3. Positive electrode 1 has positive electrode lead 8 made of aluminum, for example, and reduces lithium ions during discharge. Negative electrode 2 faces positive electrode 1, and has negative electrode lead 9 made of copper, for example, at its one end. Insulating sheets 10 and 11 are mounted to the top side and bottom side of electrode group 4, the other end of positive electrode lead 8 is welded to sealing plate 6, and the other end of negative electrode lead 9 is welded to the bottom of battery case 5 and is inserted into battery case 5. Nonaqueous electrolyte (not shown) for conducting lithium ions is injected into battery case 5, and an opening end of battery case 5 is caulked to sealing plate 6 via gasket 7. Positive electrode 1 has collecting body 12 and positive electrode mixture layer 13 containing positive electrode active material, and negative electrode 2 has collecting body 14 and negative electrode active material layer 15 disposed on its surface.

Positive electrode mixture layer 13 contains, as positive electrode active material, lithium-containing composite oxide such as $LiCoO_2$, $LiNiO_2$, $Li_2MnO_4$, a mixture of them, or a composite compound of them. As the positive electrode active material, olivine type lithium phosphate represented by general formula $LiMPO_4$ (M=V, Fe, Ni, Mn) or fluorolithium phosphate represented by general formula $Li_2MPO_4F$ (M=V, Fe, Ni, Mn) may be used. A different element may be substituted for part of the lithium containing compounds. The surface may be treated with metal oxide, lithium oxide, or a conductive agent, or may be treated into a hydrophobic state.

Positive electrode mixture layer 13 further contains a conductive agent and binder. As the conductive agent, the following materials can be used:

a graphite group such as natural graphite or artificial graphite;

a carbon black group such as acetylene black, Ketjen black, channel black, furnace black, lamp black, or thermal black;

a conductive fiber group such as carbon fiber or metal fiber;

a metal powder group such as carbon fluoride or aluminum;

a conductive whisker group such as zinc oxide or potassium titanate;

a conductive metal oxide such as titanium oxide; and an organic conductive material such as phenylene derivative.

As the binder, the following material can be used: polyvinylidene fluoride (PVDF); polytetrafluoroethylene; polyethylene; polypropylene; aramid resin; polyamide; polyimide; polyamide-imide; polyacrylonitrile; polyacrylic acid; polymethylacrylate; polyethylacrylate; polyhexylacrylate; polymethacrylic acid; polymethyl methacrylate; polyethylmethacrylate; polyhexyl methacrylate; polyvinyl acetate; polyvinyl pyrrolidone; polyether; polyethersulfone; hexafluoropolypropylene; styrene-butadiene rubber; or carboxymethylcellulose. As the binder, copolymer of two or more materials selected from the following materials may be used: tetrafluoroethylene; hexafluoroethylene; hexafluoropropylene; perfluoro alkyl vinyl ether; vinylidene fluoride; chlorotrifluoroethylene; ethylene; propylene; pentafluoro propylene; fluoromethyl vinyl ether; acrylic acid; and hexadiene. A mixture of two or more materials selected from them may be used.

As collecting body 12 used in positive electrode 1, aluminum (Al), carbon, or conductive resin can be used. They may be individually surface-treated with carbon.

As the nonaqueous electrolyte, electrolytic solution where solute is dissolved in organic solvent, or a so-called polymer electrolyte layer that contains it and is non-fluidized with polymer molecules can be used. When at least electrolytic solution is used, preferably, separator 3 such as non-woven fabric or micro porous film made of polyethylene, polypropylene, aramid resin, amide-imide, polyphenylene sulfide, or polyimide is used between positive electrode 1 and negative electrode 2, and separator 3 is impregnated with electrolytic solution. The inside or surface of separator 3 may contain a heat-resistant filler such as alumina, magnesia, silica, or titania. Besides separator 3, a heat-resistant layer made of these fillers and a binder same as that used in positive electrode 1 and negative electrode 2 may be disposed.

The nonaqueous electrolytic material is selected based on oxidation-reduction potential of each active material. As a solute preferably used in the nonaqueous electrolyte, the following material can be used: $LiPF_6$; $LiBF_4$; $LiCiO_4$; $LiAlCl_4$; $LiSbF_6$; $LiSCN$; $LiCF_3SO_3$; $LiNCF_3CO_2$; $LiAsF_6$; $LiB_{10}Cl_{10}$; lower aliphatic lithium calboxylate; LiF; LiCl; LiBr; LiI; chloroboron lithium, a borate group such as bis(1, 2-benzendiolate(2-)-O,O') lithium borate, bis(2,3-naphthalenediolate(2-)-O,O') lithium borate, bis(2,2'-biphenyldiolate (2-)-O,O') lithium borate, or bis(5-fluoro-2-olate-1-benzensulfonic acid-O,O') lithium borate, or a salt group generally used in a lithium battery such as $(CF_3SO_2)_2NLi$, $LiN(CF_3SO_2)(C_4F_9SO_2)$, $(C_2F_5SO_2)_2NLi$, or lithium tetraphenylborate.

The organic solvent for dissolving the salt is solvent generally used in a lithium battery such as one or a mixture of the following materials: ethylene carbonate (EC); propylene carbonate; butylene carbonate; vinylene carbonate; dimethyl carbonate (DMC); diethyl carbonate; ethyl methyl carbonate (EMC); dipropyl carbonate, methyl formate; methyl acetate; methyl propionate; ethyl propionate; dimethoxymethane; γ-butyrolactone; γ-valerolactone; 1,2-diethoxyethane; 1,2-dimethoxyethane; ethoxymethoxyethane; trimethoxy methane; tetrahydrofuran; tetrahydrofuran derivative such as 2-methyltetrahydrofuran; dimethyl sulfoxide; 1,3-dioxolane; dioxolane derivative such as 4-methyl-1,3-dioxolane; formamide; acetamide; dimethylformamide; acetonitrile; propyl nitrile; nitromethane; ethylmonoglyme; phosphotriester; acetic acid ester; propionic acid ester; sulfolane; 3-methyl sulfolane; 1,3-dimethyl-2-imidazolidinone; 3-methyl-2-oxazolidinone; propylene carbonate derivative; ethyl ether; diethyl ether; 1,3-propanesultone; anisole; and fluorobenzene.

The solvent may contain an additive such as vinylene carbonate, cyclohexylbenzene, biphenyl, diphenyl ether, vinyl ethylene carbonate, divinyl ethylene carbonate, phenylethylene carbonate, diallyl carbonate, fluoroethylene carbonate, catechol carbonate; vinyl acetate, ethylene sulfite, propanesultone, trifluoro propylene carbonate; dibenzofuran, 2,4-difluoroanisole, o-terphenyl, or m-terphenyl.

The nonaqueous electrolyte may be used as solid electrolyte by mixing the solute into one or a mixture of the following polymeric materials: polyethylene oxide; polypropylene oxide; polyphosphazene; polyaziridine; polyethylene sulfide; polyvinyl alcohol; polyvinylidene-fluoride; and polyhexafluoropropylene. The nonaqueous electrolyte may be used in a gel shape by being mixed into the organic solvent. As the solid electrolyte, inorganic material such as the following material may be used: lithium nitride; lithium halide; lithium oxoate; $Li_4SiO_4$; $Li_4SiO_4$—LiI—LiOH; $Li_3PO_4$—$Li_4SiO_4$; $Li_2SiS_3$; $Li_3PO_4$—$Li_2S$—$SiS_2$; or a phosphorus sulfide compound. When the gel nonaqueous electrolyte is used, the gel nonaqueous electrolyte may be arranged between positive electrode 1 and negative electrode 2, instead of the separator. The gel nonaqueous electrolyte may be arranged adjacently to separator 3.

Negative electrode active material layer 15 contains composite negative electrode active material where carbon nanofiber (hereinafter referred to as "CNF") is stuck to the surface of negative electrode active material capable of storing and discharging at least lithium ions. Since CNF is stuck or fixed to the surface of the negative electrode active material, resistance against collection in the battery becomes low and high electron conductivity is maintained.

Negative electrode active material layer 15 further contains a binder. As the binder, a binder same as that used in positive electrode 1 can be used. For example, the following material can be used: polyvinylidene fluoride (PVDF); polytetrafluoroethylene; polyethylene; polypropylene; aramid resin; polyamide; polyimide; polyamide-imide; polyacrylonitrile; polyacrylic acid; polymethylacrylate ester; polyethylacrylate ester; polyhexylacrylate ester; polymethacrylic acid; polymethyl methacrylate ester; polyethylmethacrylate ester; polyhexyl methacrylate ester; polyvinyl acetate; polyvinyl pyrrolidone; polyether; polyether sulfone; hexafluoropolypropylene; styrene-butadiene rubber; or carboxymethylcellulose. As the binder, copolymer of two or more selected from the following materials may be used: tetrafluoroethylene; hexafluoroethylene; hexafluoropropylene; perfluoro alkyl vinyl ether; vinylidene fluoride; chlorotrifluoroethylene; ethylene; propylene; pentafluoro propylene; fluoromethyl vinyl ether; acrylic acid; and hexadiene.

If necessary, negative electrode active material layer 15 is mixed with a conductive agent such as the following material:
- a graphite group such as natural graphite (e.g. flake graphite), artificial graphite, or expanded graphite;
- a carbon black group such as acetylene black, Ketjen black, channel black, furnace black, lamp black, or thermal black;
- a conductive fiber group such as carbon fiber or metal fiber;
- a metal powder group such as copper or nickel; and
- an organic conductive material such as polyphenylene derivative.

As collecting body 14, metal foil of stainless steel, nickel, copper, or titan, or thin film of carbon or conductive resin can be used. They may be surface-treated with carbon, nickel, or titan.

The composite negative electrode active material is described hereinafter. As the negative electrode active material, a material such as silicon (Si) or tin (Sn) can be used that has a theoretical capacity density exceeding 833 $mAh/cm^3$ at which lithium ions are reversibly stored and discharged. Any composite negative electrode active material that has a single body, alloy, compound, or solid solution form and contains a silicon-containing material or tin-containing material can exhibit the advantage of the present invention as long as this material has the above-mentioned property. As silicon-containing material, Si, $SiO_x$ (0.05<x<1.95), or an alloy, compound, or solid solution of one of them can be used. Here, in the alloy, compound, or solid solution, at least one or more elements selected from the group of B, Mg, Ni, Ti, Mo, Co, Ca, Cr, Cu, Fe, Mn, Nb, Ta, V, W, Zn, C, N, and Sn are substituted for part of the Si. As tin-containing material, $Ni_2Sn_4$, $Mg_2Sn$, $SnO_x$ (0<x<2), $SnO_2$, $SnSiO_3$, or LiSnO can be used.

The negative electrode active material may be made of one material, or may be made of a plurality of materials. When negative electrode active material is made of a plurality of materials, a compound containing Si, oxygen, and nitrogen, or a combination of a plurality of compounds that contain Si and oxygen and have a different ratio of Si to oxygen is used. Above all, $SiO_x$ (0.3≦x≦1.3) is preferable, because the discharge capacity density thereof is high and the expansion coefficient thereof during charge is smaller than that of Si alone.

CNF grows around a catalyst element (not shown) carried on the surface of the negative electrode active material. In other words, the catalyst element serves as the core. As the catalyst element, at least one selected from a group of copper (Cu), iron (Fe), cobalt (Co), nickel (Ni), molybdenum (Mo), and manganese (Mn) can be used, and the growth of the CNF is promoted. Since the CNF is stuck to the surface of the negative electrode active material, a sufficient charge/discharge characteristic can be expected. Thanks to the catalyst element, the binding force with the negative electrode active material is increased, and the durability of negative electrode 2 against a rolling load can be improved in coating collecting body 14 with negative electrode active material layer 15.

In order that the catalyst element can exhibit sufficient catalysis until the completion of the growth of the CNF, preferably, the catalyst element is kept in a metal state on the surface layer of the negative electrode active material. Preferably, the catalyst element is kept in a metal particle state where particle diameter is 1 nm-1000 nm, for example. After the completion of the growth of the CNF, preferably, the metal particles of the catalyst element are oxidized.

The fiber length of the CNF is preferably 1 nm-1 mm, more preferably 500 nm-100 μM. When the fiber length of the CNF is shorter than 1 nm, the effect of increasing the conductivity of the electrode is extremely small. When the fiber length exceeds 1 mm, the density and capacity of the negative electrode active material are apt to decrease.

The form of the CNF is not especially limited. However, preferably, the CNF is made of at least one selected from a group of tubular carbon, accordion-like carbon, plate-like carbon, and herringbone-like carbon. The CNF may capture the catalyst element into itself during the growth. The fiber diameter of the CNF is preferably 1 nm-1000 nm, more preferably 50 nm-300 nm.

The catalyst element provides an active spot for growing the CNF in a metal state. When the negative electrode active material where the catalyst element is exposed at the surface in the metal state is injected into a high-temperature atmosphere including raw material gas of the CNF, the growth of the CNF proceeds. When no catalyst element exists on the surfaces of the active material particles, the CNF does not grow.

The producing method of the metal particles of the catalyst element on the surface of the negative electrode active material is not especially limited. However, a method of mixing solid metal particles into the negative electrode active material is considered, for example. A method of immersing the negative electrode active material in solution of a metal compound as raw material of the metal particles is preferable. When the solvent is removed from the negative electrode active material after the immersion in the solution, and heating is performed if necessary, an active material core can be obtained that carries the metal particles of the catalyst element on its surface uniformly in a high dispersion state. Here, the particle diameter is preferably 1 nm-1000 nm, more preferably 10 nm-100 nm.

When the particle diameters of the metal particles of the catalyst element are smaller than 1 nm, it is extremely difficult to generate the metal particles. When the particle diameters exceed 1000 nm, the sizes of the metal particles can become extremely nonuniform, the growth of the CNF can become difficult, and any electrode having high conductivity cannot be obtained. Preferably, the particle diameters of the metal particles of the catalyst element are between 1 nm and 1000 nm inclusive.

As the metal compound for producing the solution, nickel nitrate, cobalt nitrate, iron nitrate, copper nitrate, manganese nitrate, or 7-molybdate-6-ammonium-4-hydrate is used. As the solvent used in the solution, suitable material is selected from water, organic solvent, and a mixture of water and organic solvent in consideration of suitability for solubility of the compound and the electrochemical active phase. As the organic solvent, ethanol, isopropyl alcohol, toluene, benzene, hexane, or tetrahydrofuran can be used.

While, alloy particles of the catalyst element are synthesized and can be used as the negative electrode active material. In this case, an alloy of Si, Sn and the catalyst element is synthesized by a usual alloy manufacturing method. The element such as Si or Sn electrochemically reacts with lithium to produce the alloy, so that the electrochemical active phase is produced. At least part of the metal phase of the catalyst element has a particle shape with a particle diameter of 10 nm-100 nm, and is exposed at the surface of the alloy particles.

The content of the metal particles or metal phase of the catalyst element is preferably 0.01 wt %-10 wt % of the negative electrode active material, more preferably 1 wt %-3 wt %. When the content of the metal particles or metal phase is extremely small, long time is taken to grow the CNF and the productivity can decrease. When the content of the metal particles or metal phase of the catalyst element is extremely large, the CNF with nonuniform and large fiber diameter grows due to agglomeration of the catalyst element, and hence the conductivity of the mixture layer and the density of the negative electrode active material are reduced. The percentage of the electrochemical active phase relatively reduces, and it becomes difficult to use the composite negative electrode active material as a high-capacity electrode material.

As the negative electrode active material layer, a negative electrode active material capable of storing and discharging at least lithium ions may be formed alone on the collecting body. In this case, the negative electrode active material is directly deposited on the collecting body using a physical or chemical vapor growth method such as a vacuum deposition method or sputtering method.

Figure 2:
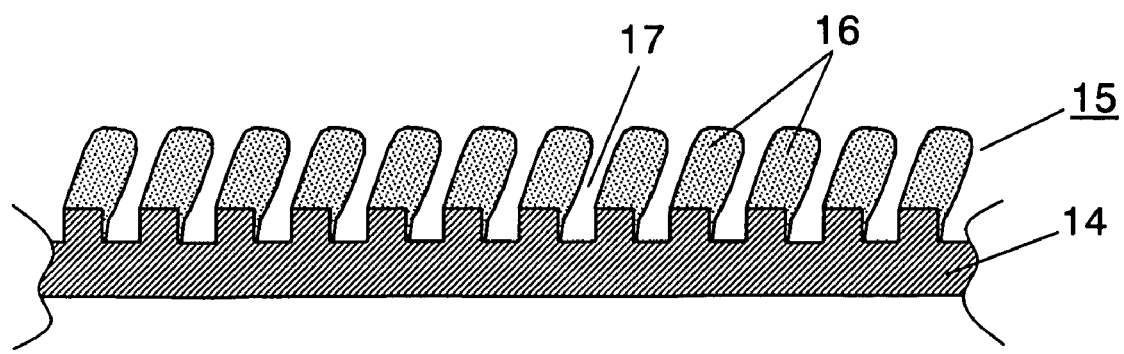
FIG. 2 is a sectional view of a negative electrode for the nonaqueous electrolytic rechargeable battery in accordance with the exemplary embodiment.

Preferably, the negative electrode active material layer previously has predetermined voids. In this case, as shown later in example 10 in detail, a negative electrode that has negative electrode active material layer 15 including separated columnar bodies 16 having voids 17 shown in FIG. 2 can be formed on a collecting body having an uneven part by an oblique deposition method using a sputtering method or vacuum deposition method.

A method of manufacturing a negative electrode for a nonaqueous electrolytic rechargeable battery in accordance with the exemplary embodiment of the present invention is hereinafter described in detail with reference to FIG. 3A through FIG. 3E.

FIG. 3A through FIG. 3E are sectional views illustrating the method of manufacturing the negative electrode for the nonaqueous electrolytic rechargeable battery of the exemplary embodiment. FIG. 4 is a sectional view illustrating an example of the step of diffusing lithium metal in the negative electrode active material layer of FIG. 3C.

Figure 3A:
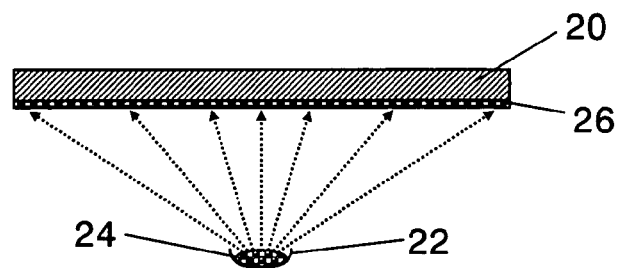
FIG. 3A, FIG. 3B, FIG. 3C, FIG. 3D and FIG. 3E are sectional views illustrating a method of manufacturing the negative electrode for the nonaqueous electrolytic rechargeable battery in accordance with the exemplary embodiment.
Figure 4:
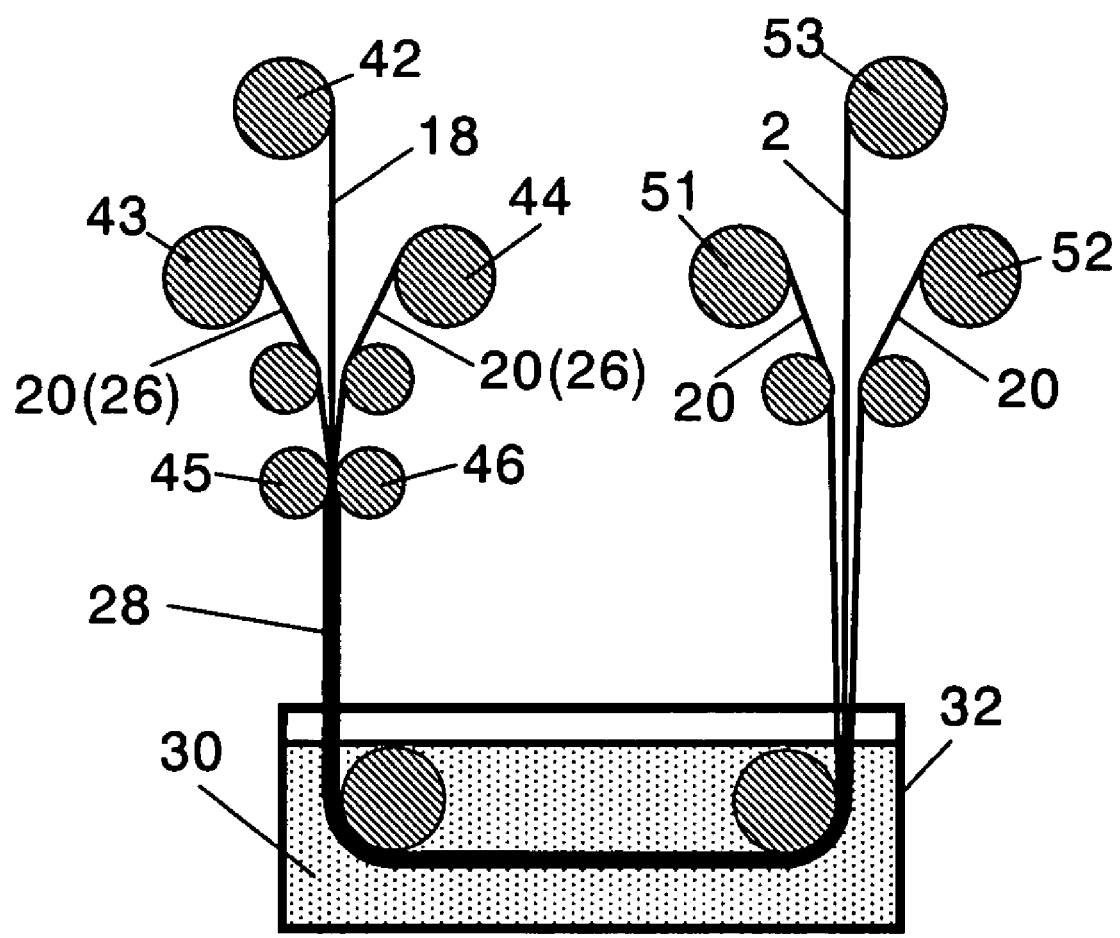
FIG. 4 is a sectional view illustrating the method of manufacturing the negative electrode for the nonaqueous electrolytic rechargeable battery in accordance with the exemplary embodiment in detail.

First, in FIG. 3A, lithium metal rod 24 in evaporation boat 22 is evaporated by a gas phase method using a vacuum deposition method such as resistance heating, and 5 μm-thick lithium metal layer 26, for example, is formed on carrier substrate 20 made of copper or the like.

The thickness of lithium metal layer 26 is preferably between 1 μm and 30 μm. When the thickness is 1 μm or smaller, the capacity corresponding to the irreversible capacity of the negative electrode active material cannot be compensated, and hence the capacity of the battery decreases. When the thickness is 30 μm or larger, the flatness of lithium metal layer 26 decreases, and hence the layer partly comes into contact with the surface of the negative electrode active material layer. As a result, storage variation of lithium metal in the negative electrode occurs, and the charge/discharge cycle characteristic is reduced by deformation of the negative electrode due to local expansion of the negative electrode active material or by nonuniform reaction during charge and discharge.

Lithium metal layer 26 may be also formed by a usually used gas phase method such as an ion plating method, electron beam deposition method, or sputtering method. Thus, uniform lithium metal layer 26 can be formed at a high speed.

As carrier substrate 20, metal foil mainly made of transition metal can be used because the transition metal is chemically stable for lithium metal. As the transition metal, not only copper but also nickel can be used. These metals have high thermal conductivity, so that the heat generation in lithium metal layer 26 during film forming is suppressed and smooth lithium metal layer 26 can be produced. If sufficient cooling is allowed, a polymeric film made of polyolefine such as polyethylene or polypropylene, polyethylene terephthalate, polyimide, or polyamide can be used.

Figure 3B:
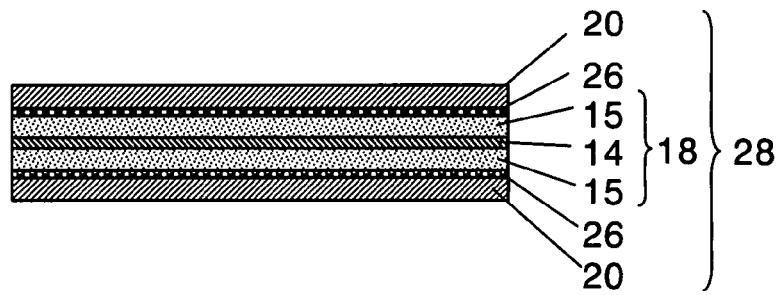

In FIG. 3B, lithium metal layers 26 formed on carrier substrates 20 are stuck to the surfaces of negative electrode precursor 18 by contact and pressurization, thereby forming integrated member 28. Here, negative electrode precursor 18 has negative electrode active material layers 15 disposed on both surfaces of collecting body 14.

Figure 3C:
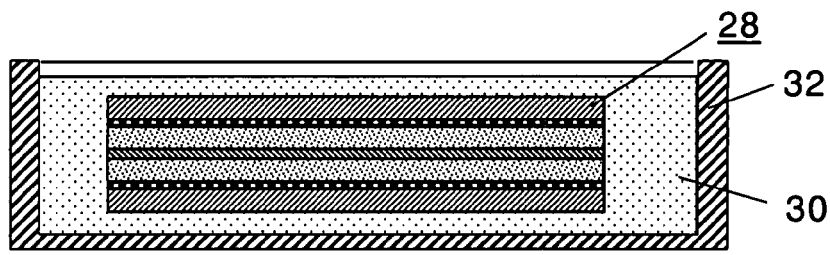
Figure 3D:
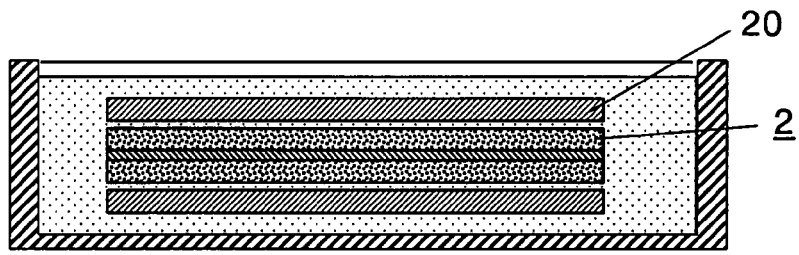

In FIG. 3C, integrated member 28 where lithium metal layers 26 are brought into contact with negative electrode precursor 18 is immersed and stored in reaction tank 32. Reaction tank 32 is filled with nonaqueous electrolyte 30 composed of nonaqueous solvent or both nonaqueous solvent and electrolyte salt. Thus, as shown in FIG. 3D, lithium metal is stored from lithium metal layers 26 into negative electrode active material layers 15 of negative electrode precursor 18, thereby producing negative electrode 2.

Figure 3E:

In FIG. 3E, negative electrode 2 storing lithium metal is taken from nonaqueous electrolyte 30, and carrier substrates 20 are separated.

In these steps, a negative electrode for a nonaqueous electrolytic rechargeable battery reducing the irreversible capacity is produced.

The steps of FIG. 3B through FIG. 3E are further described with reference to FIG. 4.

In FIG. 4, first, negative electrode precursor 18 is wound off from roll 42, and carrier substrates 20 having lithium metal layers 26 are wound off from rolls 43 and 44, at an arbitrary speed. Then, when they pass between rollers 45 and 46, negative electrode active material layers 15 of negative electrode precursor 18 are brought into contact with and stuck to the whole surfaces of lithium metal layers 26 of carrier substrates 20 by pressurization, for example, thereby forming integrated member 28. Preferably, the pressurization is performed in sticking if necessary. Thus, the faces of each negative electrode active material layer 15 and each lithium metal layer 26 uniformly come into contact with each other, so that the lithium metal can be diffused more uniformly.

The lithium metal in lithium metal layers 26 is diffused into negative electrode active material layers 15 by aging treatment, thereby forming negative electrode 2. Here, in the aging treatment, integrated member 28 is passed through reaction tank 32 filled with nonaqueous electrolyte 30. Reaction tank 32 can be heated by a heater.

Integrated member 28, after coming from reaction tank 32, is divided into carrier substrates 20 and negative electrode 2 storing the lithium metal. When nonaqueous electrolyte 30 is nonaqueous solvent, carrier substrates 20 are wound on rolls 51 and 52, and negative electrode 2 is wound on roll 53.

Figure 5:
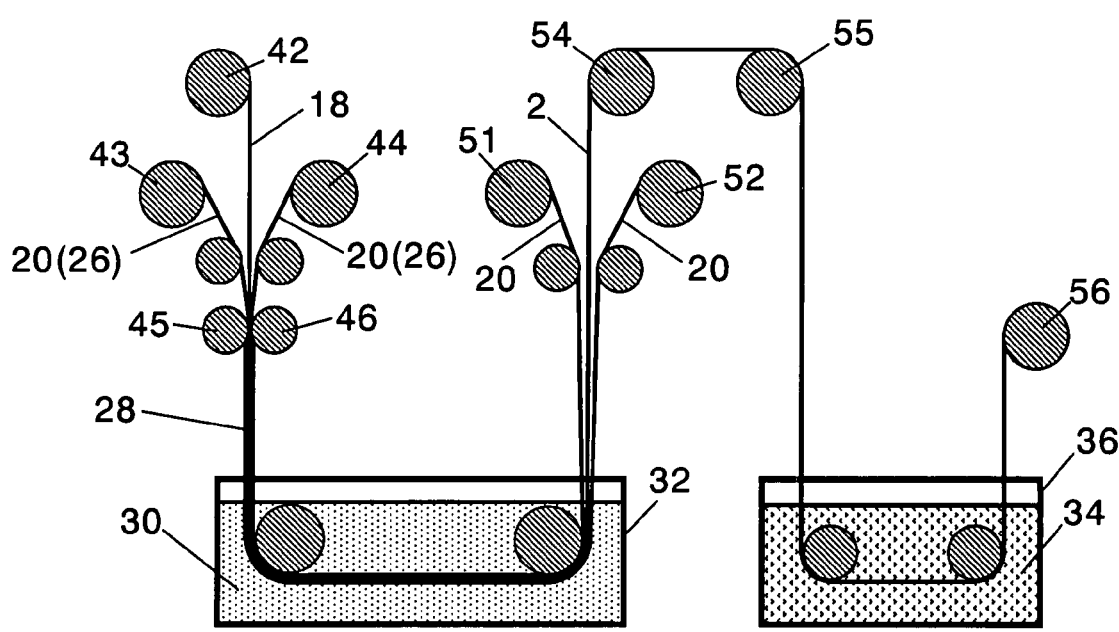
FIG. 5 is a sectional view illustrating another method of manufacturing the negative electrode for the nonaqueous electrolytic rechargeable battery in accordance with the exemplary embodiment.

When nonaqueous solvent and electrolyte salt are used as nonaqueous electrolyte 30, for example, negative electrode 2 passes through rollers 54 and 55 and then cleaning tank 36 filled with cleaning fluid 34, as shown in FIG. 5. This process dissolves and removes electrolyte salt remaining in negative electrode 2. After that, negative electrode 2 that is wound on roll 56 and stores lithium metal is manufactured.

Nonaqueous electrolyte 30 in which integrated member 28 is immersed is composed of nonaqueous solvent or both nonaqueous solvent and electrolyte salt. Here, in integrated member 28, negative electrode active material layers 15 are in contact with lithium metal layers 26 on the whole surfaces. The nonaqueous solvent is used for minimizing side reaction between the nonaqueous electrolyte and the negative electrode active material storing lithium metal or lithium. Nonaqueous electrolyte 30 is described hereinafter.

As nonaqueous solvent used for nonaqueous electrolyte 30, polar solvent is already known, but nonpolar solvent can be also used. Nonpolar solvent is aromatic hydrocarbon such as aromatic benzene or aromatic toluene, or aliphatic hydrocarbon such as n-hexane or cyclohexane.

Nonaqueous solvent used for nonaqueous electrolyte 30 composed of both the nonaqueous solvent and electrolyte salt is not especially limited, but nonaqueous solvent generally used in the concerned field can be employed. In other words, as the nonaqueous solvent, aprotic organic solvent can be used. For example, the aprotic organic solvent is the following materials:

annular carbonate such as ethylene carbonate, propylene carbonate, or butylenes carbonate;

annular carboxylate ester such as γ-butyrolactone, γ-valerolactone, or furanone;

chain carbonate such as diethyl carbonate, ethyl methyl carbonate, or dimethyl carbonate;

chain ether such as 1,2-methoxyethane, 1,2-ethoxyethane, or ethoxymethoxyethane; and annular ether such as tetrahydrofuran or 2-methyl tetrahydrofuran. They may be used independently, or a combination of two or more of them may be used. The electrolyte salt is preferably lithium salt, but may contain the following materials:

lithium perfluoro alkyl sulfonate imide such as $LiPF_6$, $LiAsF_6$, $LiN(CF_3SO_2)_2$, $LiN(C_4F_9SO_2)_2$, $LiN(CF_3SO_2)(C_4F_9SO_2)$; and lithium perfluoro alkyl sulfonate methide such as $LiC(CF_3SO_2)_2$.

In the aging treatment, the storing reaction rate of lithium metal into negative electrode active material layers 15 can be increased, by warming reaction tank 32 of nonaqueous electrolyte 30 in which negative electrode active material layers 15 in contact with lithium metal layers 26 is immersed. Therefore, the aging treatment can be performed in a short time, and hence the productivity is improved. The temperature of reaction tank 32 is not especially limited as long as negative electrode active material layers 15, lithium metal layers 26, and nonaqueous electrolyte 30 are physically and chemically stable at room temperature or above. For speeding up the storing reaction of the lithium metal into negative electrode active material layers 15, sealing and pressuring are added to the warming.

Specific examples of the exemplary embodiment of the present invention are described hereinafter.

Example 1

(1) Production of Negative Electrode (Production of Negative Electrode Precursor)

As a negative electrode active material capable of storing and discharging lithium ions, silicon oxide ($SiO_x$) that is produced in the following method and has CNF grown on its surface is used.

One part-by-weight of nickel nitrate (II) 6 hydrate (reagent chemicals manufactured by Kanto Chemical Co., Inc.) is added to 99 parts-by-weight of SiO powder (manufactured by Wako Pure Chemicals, Ltd.), and they are carried on the surface of the SiO particles. Here, the SiO powder is previously crushed and classified to have an average particle diameter of 10 μm. Then, they are heated to 550° C. under helium gas atmosphere, and the nickel nitrate is reduced to Ni element.

Mixed gas of 50 vol % of hydrogen gas and 50 vol % of methane gas is then substituted for the helium gas. Then, the SiO particles are held at 550° C. for 10 minutes to grow the CNF on the surface of the SiO particles.

Then, helium gas is substituted for the mixed gas, and the SiO particles are cooled, thereby producing negative electrode active material made of SiO-CNF.

The content of CNF in the negative electrode active material is determined to be 21 wt % in total of SiO, CNF, and Ni element, based on the weight variation before and after the treatment.

Polyacrylic acid aqueous solution (manufactured by Wako Pure Chemical Industries, Ltd., polyacrylic acid: 25 wt %) as a binder is mixed into 85 parts-by-weight of negative electrode active material produced above so that the weight of the polyacrylic acid is 15 parts-by-weight.

Then, the obtained mixture is kneaded with appropriate amount of pure water to prepare negative electrode active material paste. The negative electrode active material paste is applied to both surfaces of a collecting body (10 μm thick) made of copper foil by a doctor blade method, and they are rolled. Then, they are dried to produce a negative electrode precursor having a negative electrode active material layer of which total thickness (including copper foil) after dry is 100 μm.

(Production of Lithium Metal Layer)

A 12 μm-thick lithium metal layer is formed on 14 μm-thick rolled copper (Cu) foil as a carrier substrate on the following deposition condition using the vacuum deposition method.

First, an evaporation boat (manufactured by Furuuchi Chemical Corporation) made of tantalum as an evaporation source is used, and a lithium metal rod (manufactured by Honjo Chemical Corporation) is mounted in the evaporation boat. The evaporation boat is then connected to a direct-current power supply installed outside a vacuum tank, the lithium metal rod is evaporated by a resistance heating method, and a lithium metal layer is formed on the carrier substrate by vacuum deposition.

At this time, the vacuum deposition is performed in the state where the rotation speed of a film-forming can roll is 10 cm/min at degree of vacuum of 0.9 Pa and the surface temperature is kept at 20° C. After forming the lithium metal layer, argon (manufactured by Taiyo Nippon Sanso Corporation, 99.999%) and oxygen (manufactured by Taiyo Nippon Sanso Corporation, 99.999%) are injected at a volume ratio of 95:5, and the pressure is returned to atmospheric pressure. The obtained lithium metal layer is extremely uniform and has a smooth surface.

(Lithium Metal Storing Step)

An integrated member is formed by superimposing a negative electrode precursor having the negative electrode active material produced by the above method on the carrier substrate having the lithium metal layer via the rollers using the device shown in FIG. 4. The integrated member is held in nonaqueous electrolyte A that is made of 1 mol $LiPF_6$/EC:EMC (3:7) filled in the reaction tank at 20° C., until the lithium metal layer disappears, namely for a reaction time. The reaction time is defined between the time when the integrated member is put into the reaction tank and the time when the lithium metal layer formed on the carrier substrate is stored in the negative electrode active material and the lithium metal does not remain on the carrier substrate. The reaction time is adjusted by controlling the travel speed of the integrated member in nonaqueous electrolyte A.

Then, a 30 mm-wide exposed part is formed on the Cu foil that does not face the positive electrode on the inner peripheral side of the negative electrode, and a Cu negative electrode lead is welded to the exposed part.

A negative electrode of sample 1 is produced in the above steps.

(2) Production of Positive Electrode

A positive electrode having positive electrode active material capable of storing and discharging lithium ions is produced in the following method.

First, 93 parts-by-weight of $LiCoO_2$ powder as the positive electrode active material and 4 parts-by-weight of acetylene black as the conductive agent are mixed. N-methyl-2-pyrolidone (NMP) solution (product number #1320 manufactured by Kureha Corporation) of polyvinylidene fluoride (PVDF) as a binder is mixed into the obtained powder so that the weight of PVDF is 3 parts-by-weight. An appropriate amount of NMP is added to the obtained mixture to prepare paste for a positive electrode mixture. The obtained paste for the positive electrode mixture is applied onto a collecting body (15 μm thick) made of aluminum (Al) foil using the doctor blade method. The applied product is rolled so that the density of the positive electrode mixture layer becomes 3.5 g/cc and the thickness becomes 160 μm, and is sufficiently dried at 85° C. The product is cut into a 57 mm-wide and 600 mm-long shape to form a positive electrode. A 30 mm-wide exposed part is formed on the Al foil that does not face the negative electrode on the inner peripheral side of the positive electrode, and an Al-made positive electrode lead is welded to the exposed part.

(3) Production of Battery

The positive electrode and negative electrode produced above are wound via a 20 μm-thick separator made of polypropylene so that the negative electrode active material layer lies inside, thereby forming an electrode group. The formed electrode group is inserted into a battery case (material: Ni-plated iron, diameter: 18 mm, and height: 65 mm) for a cylindrical battery of which only one side is open, an insulating plate is disposed between the battery case and the electrode group, the negative electrode lead is welded to the battery case, and then the positive electrode lead is welded to a sealing plate, thereby producing a battery.

The produced battery is heated to 60° C. in vacuum to be dried, then 5.8 g of electrolyte in which 1.2 mol/$dm_3$ of $LiPF_6$ is dissolved is injected into nonaqueous solvent, and the sealing plate is caulked and sealed by the battery case, thereby producing a nonaqueous electrolytic rechargeable battery. Here, the nonaqueous solvent contains ethylene carbonate (EC), dimethyl carbonate (DMC), and ethyl methyl carbonate (EMC) at a volume ratio of 2:3:3.

This is called sample 1.

Example 2

A nonaqueous electrolytic rechargeable battery of sample 2 is produced by a method similar to that of example 1. In sample 2, however, the temperature of nonaqueous electrolyte A in the reaction tank is set at 30° C.

Example 3

A nonaqueous electrolytic rechargeable battery of sample 3 is produced by a method similar to that of example 1. In sample 3, however, the temperature of nonaqueous electrolyte A in the reaction tank is set at 45° C.

Example 4

A nonaqueous electrolytic rechargeable battery of sample 4 is produced by a method similar to that of example 3. In sample 4, however, nonaqueous electrolyte B made of 0.1 mol LiPF$_6$/EC:EMC (3:7) is used as the nonaqueous electrolyte in the reaction tank.

Example 5

A nonaqueous electrolytic rechargeable battery of sample 5 is produced by a method similar to that of example 3. In sample 5, however, nonaqueous electrolyte C made of cyclohexane (manufactured by Kanto Chemical Co., Inc.) is used as the nonaqueous electrolyte in the reaction tank. Nonaqueous electrolyte C does not especially require a cleaning step for dissolving electrolyte salt.

Example 6

A nonaqueous electrolytic rechargeable battery of sample 6 is produced by a method similar to that of example 3. In sample 6, however, titan(Ti)-silicon(Si) that is produced in the following method and has CNF grown on its surface is used as the negative electrode active material capable of storing and discharging lithium ions, and the thickness of the lithium metal layer is 7 μm.

A method of producing the negative electrode active material made of Ti—Si is described.

First, using a Ti—Si alloy obtained by a melting method as a starting material, a Ti—Si alloy capable of storing and discharging lithium ions is produced in an argon (Ar) atmosphere by a mechanical alloying method. The produced material has 9 wt % of Ti and 91 wt % of Si.

According to analysis by an electron diffraction method using a transmission electron microscope, the Ti—Si alloy includes two phases, TiSi$_2$ phase and Si phase. The produced Ti—Si alloy is classified to produce a Ti—Si alloy with an average particle diameter of 10 μm. The negative electrode active material is produced by a method similar to that of example 3, except for using such a Ti—Si alloy. The content of the CNF in the negative electrode active material is 23 wt % in total of the Ti—Si alloy, CNF, and Ni element.

Example 7

A nonaqueous electrolytic rechargeable battery of sample 7 is produced by a method similar to that of example 3. In sample 7, however, SiO$_{0.5}$ produced in the following method is used as the negative electrode active material capable of storing and discharging lithium ions, and the thickness of the lithium metal layer is 10 μm.

A method of producing the negative electrode active material made of SiO$_{0.5}$ is described hereinafter.

First, Si (manufactured by Furuuchi Chemical Corporation, purity: 99.999%, ingot) is injected into a graphite-made crucible. Electrolytic Cu foil (manufactured by Furukawa Circuit Foil Co., Ltd., thickness: 18 μm) defining a collecting body is then stuck and fixed to a water-cooled roller installed in a vacuum deposition device.

The graphite crucible having Si is disposed directly below it, a nozzle for guiding oxygen gas is installed between the crucible and the Cu foil, the flow rate of oxygen gas (manufactured by Taiyo Nippon Sanso Corporation, purity: 99.7%) is set at 20 sccm (20 cm$^3$ per minute), and oxygen is injected into the vacuum deposition device. The vacuum deposition is performed using an electron beam. At this time, the deposition is performed on the condition that acceleration voltage is −8 kV and current is 150 mA.

Thus, a negative electrode active material layer with a thickness of about 15 μm is formed on one surface of the electrolytic Cu foil. The negative electrode active material layer can be directly formed on the electrolytic Cu foil, so that the binder used for forming the negative electrode active material layer of example 3 is not especially required According to measurement of the oxygen amount contained in the negative electrode active material by a combustion method, the composition is represented by SiO$_{0.5}$.

Example 8

A nonaqueous electrolytic rechargeable battery of sample 8 is produced by a method similar to that of example 3. In sample 8, however, graphite produced by the following method is used as the negative electrode active material capable of storing and discharging lithium ions, and the thickness of the lithium metal layer is 3 μm.

A method of producing a negative electrode precursor using negative electrode active material made of graphite is described hereinafter.

First, 95 parts-by-weight of massive artificial graphite (MAG-D manufactured by Hitachi Chemical Co., Ltd.), 3 parts-by-weight of styrene-butadiene rubber (SBR) as a binder, 1 part-by-weight of carboxymethylcellulose (CMC) (manufactured by Dai-ichi Kogyo Seiyaku Co., Ltd.) as a thickener, and appropriate amount of water are mixed by a planetary mixer, and negative electrode active material paste is prepared. This paste is applied to both surfaces of a collecting body (10 μm thick) made of copper foil, and they are dried and rolled, thereby producing a negative electrode precursor having a negative electrode active material.

Example 9

A nonaqueous electrolytic rechargeable battery of sample 9 is produced by a method similar to that of example 3. In sample 9, however, the thickness of the negative electrode active material layer that is formed by vacuum-depositing Si by a method similar to that of example 7 without using oxygen is 8 μm, and the thickness of the lithium metal layer is 6 μm.

Example 10

Figure 6:
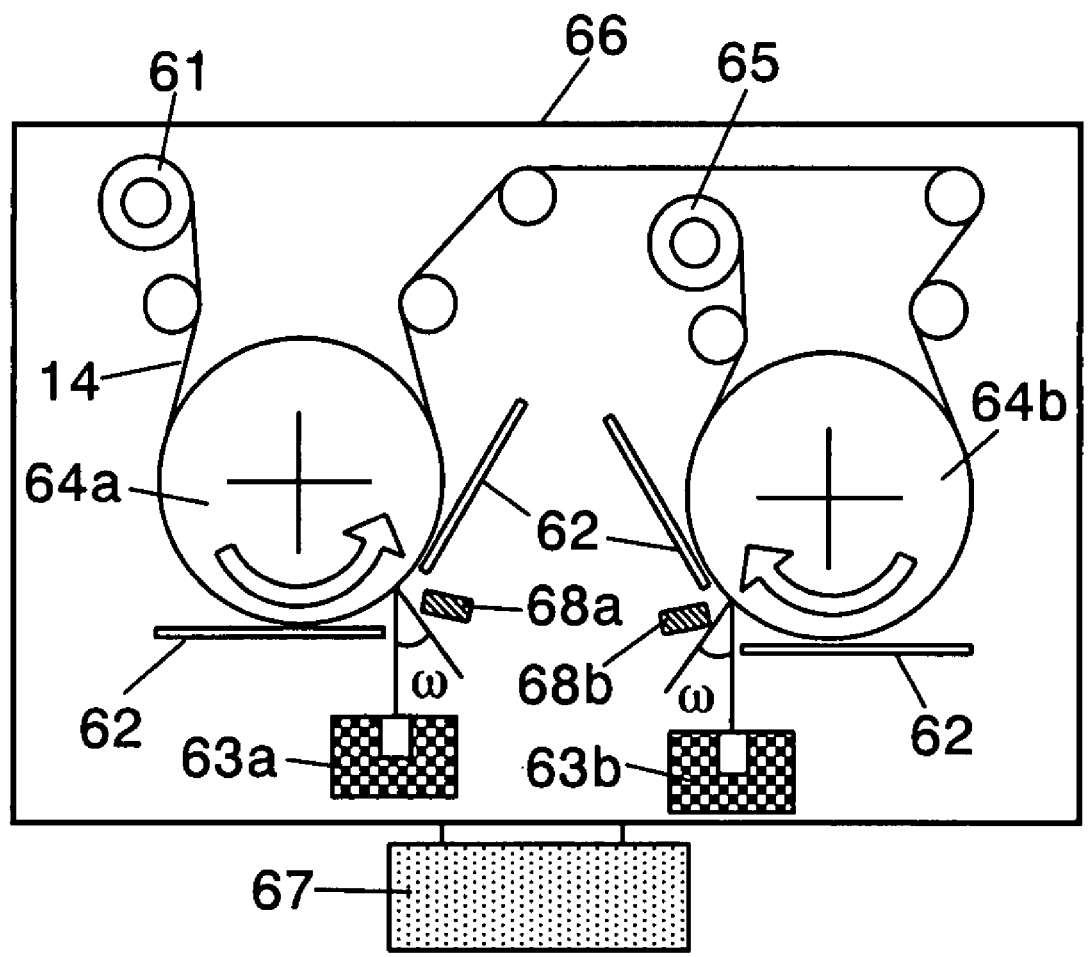
FIG. 6 is a sectional view illustrating a manufacturing device for manufacturing the negative electrode for the nonaqueous electrolytic rechargeable battery in accordance with the exemplary embodiment.

A negative electrode active material layer formed of a columnar body made of SiO$_{0.7}$ is produced in the following method using a manufacturing device shown in FIG. 6.

Collecting body 14 is sent from wind-off roll 61 to wind-up roll 65 through film forming rolls 64a and 64b. These rolls and deposition units 63a and 63b are disposed in vacuum vessel 66. The inside of vacuum vessel 66 is depressurized by vacuum pump 67. In deposition units 63a and 63b, a deposition source, crucible, and electron beam generator are unitized.

As the collecting body, 30 μm-thick electrolytic copper foil that has an uneven part of Ra=2.0 μm formed by electrolytically plating is used.

The inside of vacuum vessel 66 is argon atmosphere of pressure 1×10$^{-2}$ Pa. During deposition, an electronic beam generated by the electronic beam generator is deflected by a deflecting yoke, and is radiated to the deposition source. As the deposition source, a discard (scrap silicon, purity: 99.999%) generated in forming a semiconductor wafer is used. At this time, oxygen gas of purity 99.7% is guided from oxygen nozzles 68a and 68b disposed near the substrate into vacuum vessel 66. The shape of the opening of a mask 62 is adjusted so that evaporation particles of silicon generated from deposition units 63a and 63b do not come into collecting body 14 perpendicularly to the surface thereof. Angle w between the incident direction of the silicon evaporation particles and the incident direction of the oxygen from oxygen nozzles 68a and 68b is set at 65°.

In this structure, the evaporation particles of silicon are deposited on the uneven surface of collecting body 14.

A negative electrode active material layer including a 21 μm-thick columnar body made of $SiO_{0.7}$ is formed on a projecting part of the collecting body.

Then, the collecting body is sent to film forming roll 64b, and a negative electrode active material layer is formed on the other surface by a similar method. According to a surface and a cross section of the negative electrode active material observed using an SEM, a negative electrode active material layer having a columnar body is formed on the projecting part of the collecting body.

A nonaqueous electrolytic rechargeable battery of sample 10 is produced by a method similar to that of example 3. In sample 10, however, $SiO_{0.7}$ produced in this method is used and the thickness of the lithium metal layer is 12 μm.

Comparative Example 1

A nonaqueous electrolytic rechargeable battery of sample C1 is produced by a method similar to that of example 1. In sample C1, however, 50 μm-thick lithium metal foil is cut into narrow lines in producing a negative electrode, and the narrow lines are arranged entirely and uniformly on the negative electrode active material layer so as to cover a quarter of the area thereof.

Comparative Example 2

A nonaqueous electrolytic rechargeable battery of sample C2 is produced by a method similar to that of example 1. In sample C2, however, a lithium metal layer is formed directly on the negative electrode active material layer by a vacuum deposition method.

Comparative Examples 3 Through 8

As the negative electrode active material that does not store lithium metal, nonaqueous electrolytic rechargeable batteries of sample C3, sample C4, sample C5, sample C6, sample C7, and sample C8 are formed using SiO-CNF, Ti—Si-CNF, $SiO_{0.5}$, graphite, Si, and $SiO_{0.7}$.

Each of the nonaqueous electrolytic rechargeable batteries produced by the above-mentioned method is evaluated as follows.

(Measurement of Battery Capacity)

Each nonaqueous electrolytic rechargeable battery is charged and discharged at an ambient temperature of 25° C. on the following condition.

First, each battery having a design capacity of 2800 mAh is charged with a constant current of time rate 0.7 C until the battery voltage becomes 4.2 V, and is charged at a constant voltage of 4.2 V to reduce the current to time rate 0.05 C. A rest is then taken for 30 minutes.

Then, the battery is discharged with a constant current of time rate 0.2 C until the battery voltage lowers to 2.5 V.

Discharge capacity at this time is set as the battery capacity.

(Capacity Maintenance Ratio)

Each nonaqueous electrolytic rechargeable battery is repeatedly charged and discharged at an ambient temperature of 25° C. on the following condition.

First, each battery having the design capacity of 2800 mAh is charged with a constant current of time rate 0.5 C until the battery voltage becomes 4.2 V, and is charged at a constant voltage of 4.2 V until the charge current lowers to time rate 0.05 C. A rest is then taken for 30 minutes.

Then, the battery is discharged with a constant current of time rate 1.0 C until the battery voltage lowers to 2.5 V. A rest is then taken for 30 minutes.

This charge/discharge cycle is used as one cycle and is repeated 100 times. The ratio of discharge capacity at 100th cycle to discharge capacity at the first cycle is defined as capacity maintenance ratio (%). In other words, when the capacity maintenance ratio is close to 100, the charge/discharge cycle characteristic is high.

Specifications and evaluation results of samples 1 through 10 and samples C1 through C8 are shown in Table 1.

TABLE 1

|  | Negative electrode active material | Thickness of lithium metal layer (μm) | Nonaqueous electrolyte | Temperature of Nonaqueous electrolyte (drgree) | Reaction time (min.) | Battery Capacity (mAh) | Capacity maintenance ratio (%) |
|---|---|---|---|---|---|---|---|
| Sample 1 | SiO—CNF | 12 | A | 20 | 30 | 2675 | 83 |
| Sample 2 | SiO—CNF | 12 | A | 30 | 8 | 2670 | 84 |
| Sample 3 | SiO—CNF | 12 | A | 45 | 2 | 2675 | 82 |
| Sample 4 | SiO—CNF | 12 | B | 45 | 30 | 2677 | 83 |
| Sample 5 | SiO—CNF | 12 | C | 45 | 60 | 2669 | 83 |
| Sample 6 | Ti—Si—CNF | 7 | A | 45 | 1 | 2780 | 85 |
| Sample 7 | $SiO_{0.5}$ | 10 | A | 45 | 1 | 2850 | 86 |
| Sample 8 | Graphite | 3 | A | 45 | 0.5 | 2510 | 84 |
| Sample 9 | Si | 8 | A | 45 | 1 | 2935 | 79 |
| Sample 10 | $SiO_{0.7}$ | 12 | A | 45 | 1 | 2785 | 90 |
| Sample C1 | SiO—CNF | 50 | A | 20 | 60 | 2670 | 55 |
| Sample C2 | SiO—CNF | 12 | A | 20 | 31 | 2668 | 35 |
| Sample C3 | SiO—CNF | — | — | — | — | 1865 | 83 |
| Sample C4 | Ti—Si—CNF | — | — | — | — | 2480 | 85 |
| Sample C5 | $SiO_{0.5}$ | — | — | — | — | 2110 | 66 |
| Sample C6 | Graphite | — | — | — | — | 2350 | 84 |
| Sample C7 | Si | — | — | — | — | 2225 | 63 |
| Sample C8 | $SiO_{0.7}$ | — | — | — | — | 2165 | 67 |

In Table 1, when sample C1 is compared with sample 1, the battery capacities are substantially the same, but the capacity maintenance ratio of sample C1 is smaller than that of sample 1. That is because, in sample C1, lithium metal is not uniformly stored in the negative electrode active material layer, and hence, during repeating of the charge/discharge cycle, the capacity maintenance ratio is decreased by the partial deformation due to expansion of the negative electrode or by the nonuniform reaction in charge and discharge. When sample C2 is compared with sample 1, the initial battery capacities are substantially the same similarly to the conventional art, but the capacity maintenance ratio of sample C2 is smaller than that of sample 1. That is because, in sample C2, lithium metal is directly formed in the negative electrode active material layer, and hence the reversibility of lithium ions is decreased by the function reduction of the binder or by crystallization of amorphous material in the negative electrode active material.

When sample C3 is compared with sample 1, the capacity maintenance ratios are substantially the same, but the initial battery capacity of sample C3 is significantly smaller than that of sample 1. That is because, in sample C3, lithium metal is not uniformly stored in the negative electrode active material layer and hence the irreversible capacity is large. When samples C4 through C8 are compared with samples 6 through 10, the initial battery capacities of samples C4 through C8 are small due to the irreversible capacities, though they are not as small as that of negative electrode active material of SiO-CNF.

When samples 1 through 3 are compared with each other, their initial battery capacities and capacity maintenance ratios are substantially the same. However, the reaction can be completed in a shorter time in the sample where the temperature of the nonaqueous electrolyte for storing the lithium metal in the negative electrode active material layer is higher. Therefore, the reaction temperature is preferably higher as long as the temperature is in a range where the negative electrode active material layer, lithium metal layer, and nonaqueous electrolyte are physically and chemically stable.

When samples 3 through 5 are compared with each other, their initial battery capacities and capacity maintenance ratios are substantially the same, though the initial battery capacity of sample 4 is slightly larger. However, though the temperatures of the reaction tank are the same, their reaction times are significantly different from each other depending on the kinds of nonaqueous electrolytes for storing the lithium metal in the negative electrode active material layer. Therefore, for producing a negative electrode in a short time, nonaqueous electrolyte A of 1 mol LiPF$_6$/EC:EMC (3:7) is preferably used.

When samples 6 through 10 are compared with each other, capacity maintenance ratios are not so different from each other. However, for attaining higher battery capacity, silicon oxide particles are used as the negative electrode active material.

A wind-type cylindrical nonaqueous electrolytic rechargeable battery has been described in the present embodiment; however, the shape of the battery of the present invention is not limited to the cylindrical shape. The present embodiment can be applied to a flat battery, a wind-type square battery, a coin-shaped battery of a laminated structure, or laminate type battery, for example.

What is claimed is:

1. A method of manufacturing a negative electrode for a nonaqueous electrolytic rechargeable battery capable of storing and discharging lithium ions, the method comprising:
   forming a lithium metal layer on a carrier substrate by a gas phase method to provide a lithium-coated substrate;
   providing a negative electrode precursor including a collecting body, and a negative electrode active material layer formed on the collecting body:
   forming an integrated member by superimposing the lithium-coated substrate on the negative electrode precursor such that a whole surface of the lithium metal layer of the lithium-coated substrate is superimposed directly on the negative electrode active material layer of the negative electrode precursor, so that the integrated member includes the carrier substrate, the lithium metal layer, the negative electrode active material layer, and the collecting body;
   storing lithium metal from the lithium metal layer into the negative electrode active material layer by immersing the integrated member in nonaqueous electrolyte; and
   removing the carrier substrate from the negative electrode active material layer.

2. The method of manufacturing the negative electrode for the nonaqueous electrolytic rechargeable battery, according to claim 1,
   wherein the negative electrode active material layer includes negative electrode active material that has a theoretical capacity density exceeding 833 mAh/cm$^3$, at least lithium ions being reversibly stored and discharged at the theoretical capacity density.

3. The method of manufacturing the negative electrode for the nonaqueous electrolytic rechargeable battery, according to claim 2,
   wherein silicon-containing material is used as the negative electrode active material.

4. The method of manufacturing the negative electrode for the nonaqueous electrolytic rechargeable battery, according to claim 3,
   wherein the silicon-containing material is a silicon-containing compound that contains at least oxygen.

5. The method of manufacturing the negative electrode for the nonaqueous electrolytic rechargeable battery, according to claim 4,
   wherein the silicon-containing compound is silicon oxide represented by SiO$_x$ ($0.3 \leq x \leq 1.3$).

6. The method of manufacturing the negative electrode for the nonaqueous electrolytic rechargeable battery, according to claim 2,
   wherein the negative electrode active material layer is formed of a plurality of separated columnar bodies on the collecting body.

7. A nonaqueous electrolytic rechargeable battery comprising:
   a negative electrode for a nonaqueous electrolytic rechargeable battery that is produced by the manufacturing method of claim 1;
   a positive electrode for reversibly storing and discharging lithium ions; and
   nonaqueous electrolyte.

8. The method of manufacturing the negative electrode for the nonaqueous electrolytic rechargeable battery, according to claim 1,
   wherein said storing of the lithium metal from the lithium metal layer into the negative electrode active material layer involves warming the nonaqueous electrotype to a predetermined temperature.

9. The method of manufacturing the negative electrode for the nonaqueous electrolytic rechargeable battery, according to claim 8,
   wherein the predetermined temperature is 20° C.~45° C.

* * * * *